United States Patent
Jiang et al.

(10) Patent No.: US 12,085,978 B2
(45) Date of Patent: Sep. 10, 2024

(54) DEVICE SYNCHRONOUS CALIBRATION METHOD AND APPARATUS, DEVICES, AND STORAGE MEDIUM

(71) Applicant: RIGOL TECHNOLOGIES (BEIJING), INC., Beijing (CN)

(72) Inventors: Wenyu Jiang, Jiangsu (CN); Guiqiang Gong, Jiangsu (CN); Yue Wang, Jiangsu (CN)

(73) Assignee: RIGOL TECHNOLOGIES (BEIJING), INC., Beijing (CN)

( * ) Notice: Subject to any disclaimer, the term of this patent is extended or adjusted under 35 U.S.C. 154(b) by 48 days.

(21) Appl. No.: 18/026,672

(22) PCT Filed: Sep. 16, 2021

(86) PCT No.: PCT/CN2021/118635
§ 371 (c)(1),
(2) Date: Mar. 16, 2023

(87) PCT Pub. No.: WO2022/057844
PCT Pub. Date: Mar. 24, 2022

(65) Prior Publication Data
US 2023/0341892 A1    Oct. 26, 2023

(30) Foreign Application Priority Data
Sep. 17, 2020   (CN) .......................... 202010980816.0

(51) Int. Cl.
G06F 1/12   (2006.01)
(52) U.S. Cl.
CPC ..................................... G06F 1/12 (2013.01)

(58) Field of Classification Search
CPC ............... G06F 1/12; G06F 1/14; Y02P 90/02
See application file for complete search history.

(56) References Cited

U.S. PATENT DOCUMENTS

| | | | |
|---|---|---|---|
| 10,411,793 B1 | 9/2019 | Ramsey et al. | |
| 2011/0185216 A1* | 7/2011 | Zhao ........................ | G06F 1/14 713/400 |

(Continued)

FOREIGN PATENT DOCUMENTS

| | | |
|---|---|---|
| CN | 101515831 A | 8/2009 |
| CN | 104836654 A | 8/2015 |

(Continued)

OTHER PUBLICATIONS

International Search Report issued by the China National Intellectual Property Administration in connection with International Application No. PCT/CN2021/118635, dated Dec. 7, 2021. (English translation attached).

*Primary Examiner* — Nitin C Patel
(74) *Attorney, Agent, or Firm* — Carter, DeLuca & Farrell LLP; George Likourezos

(57) ABSTRACT

Disclosed are a device synchronization calibration method and apparatus, a device, and a storage medium. The method includes that timestamp synchronization deviations between all two devices among at least two devices is acquired, that it is determined whether each of the timestamp synchronization deviations between the all two devices is a set value, and that a synchronization calibration instruction is generated in response to a determination result that any timestamp synchronization deviation is not the set value. The synchronization calibration instruction is used for performing synchronization calibration for two devices corresponding to any timestamp synchronization deviation.

14 Claims, 6 Drawing Sheets

(56) References Cited

U.S. PATENT DOCUMENTS

2015/0139251 A1    5/2015  Tzeng
2021/0021889 A1*   1/2021  Yu ..................... H04N 21/4307

FOREIGN PATENT DOCUMENTS

| | | |
|---|---|---|
| CN | 105099647 A | 11/2015 |
| CN | 108923876 A | 11/2018 |
| CN | 109194436 A | 1/2019 |
| CN | 109327899 A | 2/2019 |
| CN | 109379160 A | 2/2019 |
| CN | 109547146 A | 3/2019 |
| CN | 109818702 A | 5/2019 |
| CN | 109842603 A | 6/2019 |
| CN | 110719135 A | 1/2020 |
| CN | 111008239 A | 4/2020 |
| CN | 111102689 A | 5/2020 |
| CN | 112214065 A | 1/2021 |

* cited by examiner

DEVICE SYNCHRONOUS CALIBRATION METHOD AND APPARATUS, DEVICES, AND STORAGE MEDIUM

CROSS-REFERENCE TO RELATED APPLICATIONS

This is a National Stage Application filed under 35 U.S.C. 371 based on International Patent Application No. PCT/CN2021/118635, filed on Sep. 16, 2021, which claims priority to Chinese Patent Application No. 202010980816.0 filed on Sep. 17, 2020, the disclosures of both of which are incorporated herein by reference in their entireties.

TECHNICAL FIELD

Embodiments of the present application relate to the field of signal processing technology, for example, a device synchronization calibration method and apparatus, a device, and a storage medium.

BACKGROUND

When multiple channels in multiple devices are synchronized or aligned, it is generally necessary to align one or more channels in a single device and then align channels between the devices. The alignment of channels between the devices is generally implemented in parallel or in series. The implementation in parallel is shown in FIG. 1. That is, the devices are connected in parallel by a synchronization source (or a synchronizer). Synchronization signals and the clock signals between the devices are closely aligned through the synchronization source. The implementation in series is shown in FIG. 2. That is, the devices are connected in series. Each delay of the devices is adjusted or supplemented by measuring the delay of a series path.

However, in the two preceding solutions, synchronization needs to be performed based on a working clock. Clock synchronization is further divided into a solution of parallel clock synchronization and a solution of serial clock synchronization. The solution of parallel clock synchronization may be understood as that a standard source outputs multiple synchronization clocks to the devices so that the frequency and phase of clocks of the devices are kept consistent. In this case, in the scenario of multiple devices, a complex clock source circuit needs to be used so as to guarantee strict alignment calibration and testing, resulting in high circuit costs. The solution of serial clock synchronization may be understood as that a clock is provided by a clock source. The devices are connected in series through the clock. Moreover, the devices perform phase detection and synchronization tracking for the clock through a phase locked loop (PLL) so that the devices have the same clock frequency. However, due to the problem of a clock path delay, a relatively fixed clock phase difference may exist, thereby resulting in an error accumulation generated between the devices in series.

SUMMARY

The present application provides a device synchronization calibration method and apparatus, a device, and a storage medium with an aim of implementing synchronization calibration between multiple devices through a timestamp synchronization deviation.

In a first aspect, embodiments of the present application provide a device synchronization calibration method applied in a controller. The method includes the steps below.

Timestamp synchronization deviations between all two devices among at least two devices is acquired.

It is determined whether the timestamp synchronization deviation between each two devices among the at least two devices is a set value.

A synchronization calibration instruction is generated based on the case where a timestamp synchronization deviation among the timestamp synchronization deviations is not the set value.

The synchronization calibration instruction is used for performing synchronization calibration for two devices corresponding to any timestamp synchronization deviation.

In a second aspect, embodiments of the present application provide a device synchronization calibration method applied in a device. The method includes the steps below.

A sampling signal is acquired.

The sampling signal is processed to generate a timestamp.

The timestamp is sent to a controller.

In a third aspect, embodiments of the present application provide a device synchronization calibration apparatus. The apparatus includes an acquisition module, a determination module, and a generation module.

The acquisition module is configured to acquire a timestamp synchronization deviation between each two devices among at least two devices.

The determination module is configured to determine whether the timestamp synchronization deviation between each two devices among the at least two devices is a set value.

The generation module is configured to generate a synchronization calibration instruction based on the case where a timestamp synchronization deviation among the timestamp synchronization deviations is not the set value.

The synchronization calibration instruction is used for performing synchronization calibration for two devices corresponding to any timestamp synchronization deviation.

In a fourth aspect, embodiments of the present application provide a device synchronization calibration apparatus. The apparatus includes an acquisition module, a processing module, and a transmission module.

The acquisition module is configured to acquire a sampling signal.

The processing module is configured to process the sampling signal to generate a timestamp.

The transmission module is configured to send the timestamp to a controller.

In a fifth aspect, embodiments of the present application provide an electronic device. The electronic device includes a memory, a processor, and a computer program stored in the memory and executable on the processor. When executing the computer program, the processor performs the device synchronization calibration method according to the preceding embodiments.

In a sixth embodiment, embodiments of the present application provide a non-transitory computer storage medium for storing a computer program. When the computer program is executed by a processor, the device synchronization calibration method according to the preceding embodiments is performed.

DETAILED DESCRIPTION

Figure 1:
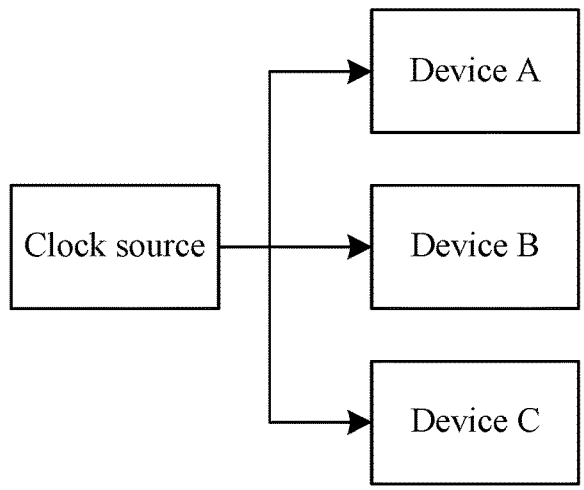
FIG. 1 is a diagram of multiple devices connected in parallel in the related art.
Figure 2:
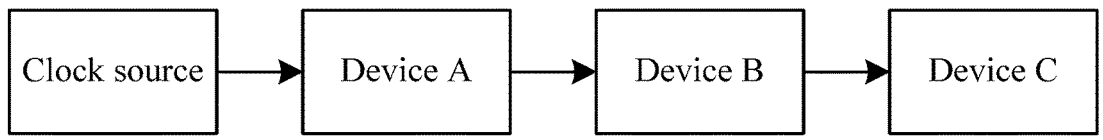
FIG. 2 is a diagram of multiple devices connected in series in the related art.

The present application is further described in detail hereinafter in conjunction with the drawings and embodiments. It is to be understood that the embodiments described herein are intended to illustrate and not to limit the present application. Additionally, it is to be noted that to facilitate description, only part, not all, of structures related to the present application are illustrated in the drawings.

Figure 3:
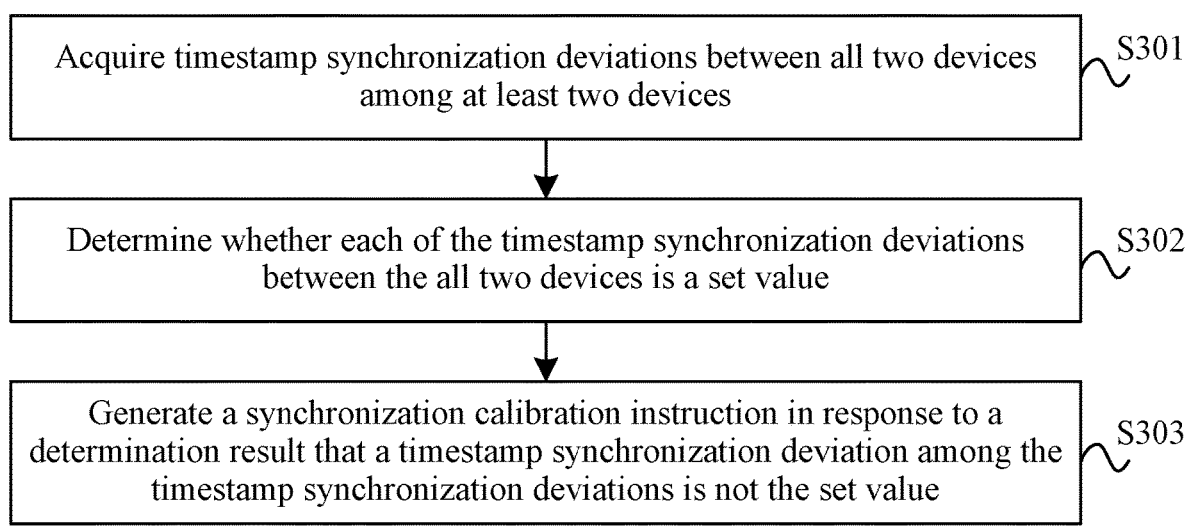
FIG. 3 is a flowchart of a device synchronization calibration method according to an embodiment of the present application.

FIG. 3 is a flowchart of a device synchronization calibration method according to an embodiment of the present application. As shown in FIG. 3, the method may be applied in a controller. The method may include but is not limited to the steps below.

In S301, timestamp synchronization deviations between all two devices among at least two devices is acquired.

In this step, timestamp synchronization deviation between two devices may be understood as a deviation between intervals of timestamps recorded by the two devices for different signals, for example, a deviation between an interval of timestamps recorded by device a for two signals and an interval of timestamps recorded by device b for the same two signals. When more than two devices exist, all devices may be combined in pairs to determine a timestamp synchronization deviation between two devices in each combination.

It is to be noted that the preceding controller may be a controller in an independent device or a controller in a preceding device.

In S302, it is determined whether the timestamp synchronization deviation between each two devices among the at least two devices is a set value.

Exemplarily, the preceding set value may be 0 or may be a fixed deviation value between two devices. If a timestamp synchronization deviation between the two devices is the set value, it indicates that transmission channels of the two devices are synchronized.

For example, for device a and device b, if the set value is 0, it indicates that a deviation between an interval of timestamps recorded by device a for two signals and an interval of timestamps recorded by device b for the same two signals is 0. That is, transmission channels of the two devices are synchronized. Similarly, in the case where the set value is a fixed deviation value, that is, in the case where a certain deviation exists between a transmission channel of device a and a transmission channel of device b, if a deviation between an interval of timestamps recorded by device a for two signals and an interval of timestamps recorded by device b for the same two signals is still the fixed deviation value, it indicates that transmission channels of the two devices are synchronized.

In S303, a synchronization calibration instruction is generated based on the case where any timestamp synchronization deviation is not the set value.

Any timestamp synchronization deviation in this step may be understood as a timestamp synchronization deviation between two devices corresponding to the synchronization deviation. If any timestamp synchronization deviation is not the set value, it indicates that data transmission channels between two devices corresponding to any timestamp synchronization deviation are not synchronized. In this case, the controller generates the synchronization calibration instruction. The synchronization calibration instruction may be used for performing synchronization calibration for two devices corresponding to any timestamp synchronization deviation.

For example, the synchronization calibration instruction may carry a calibration deviation through which the controller performs synchronization calibration for two corresponding devices.

This embodiment of the present application provides a device synchronization calibration method. The method may be applied in a controller. The method includes that timestamp synchronization deviations between all two devices among at least two devices is acquired, that it is determined whether the timestamp synchronization deviation between each two devices among the at least two devices is a set value, and that a synchronization calibration instruction is generated based on the case where any timestamp synchronization deviation is not the set value. The synchronization calibration instruction is used for performing synchronization calibration for two devices corresponding to any timestamp synchronization deviation. In this case, the arrangement of the timestamp synchronization deviation effectively alleviates a delay in synchronization between multiple devices.

Figure 4:
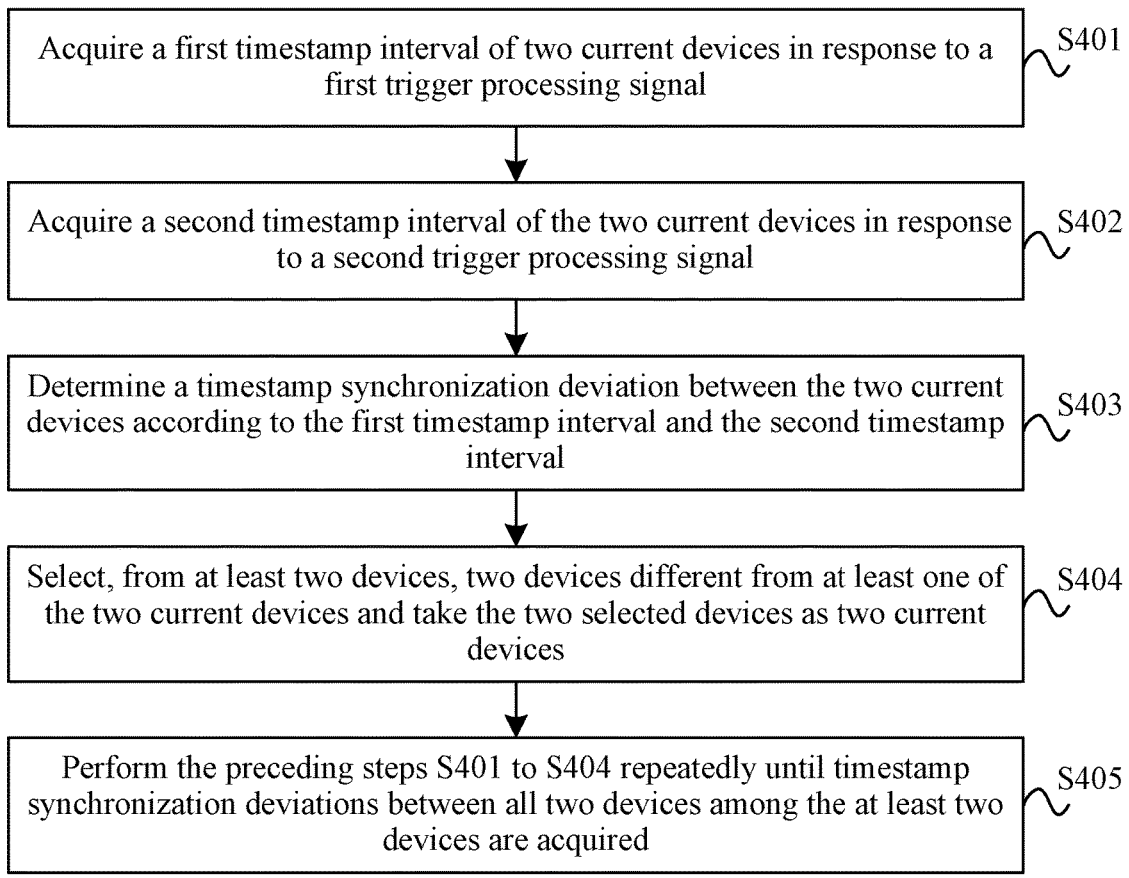
FIG. 4 is a flowchart of a device synchronization calibration method according to an embodiment of the present application.

As shown in FIG. 4, in an embodiment, the implementation of the preceding step S301 may include but is not limited to the steps below.

In S401, a first timestamp interval of two current devices in response to a first trigger processing signal is acquired.

Figure 5:
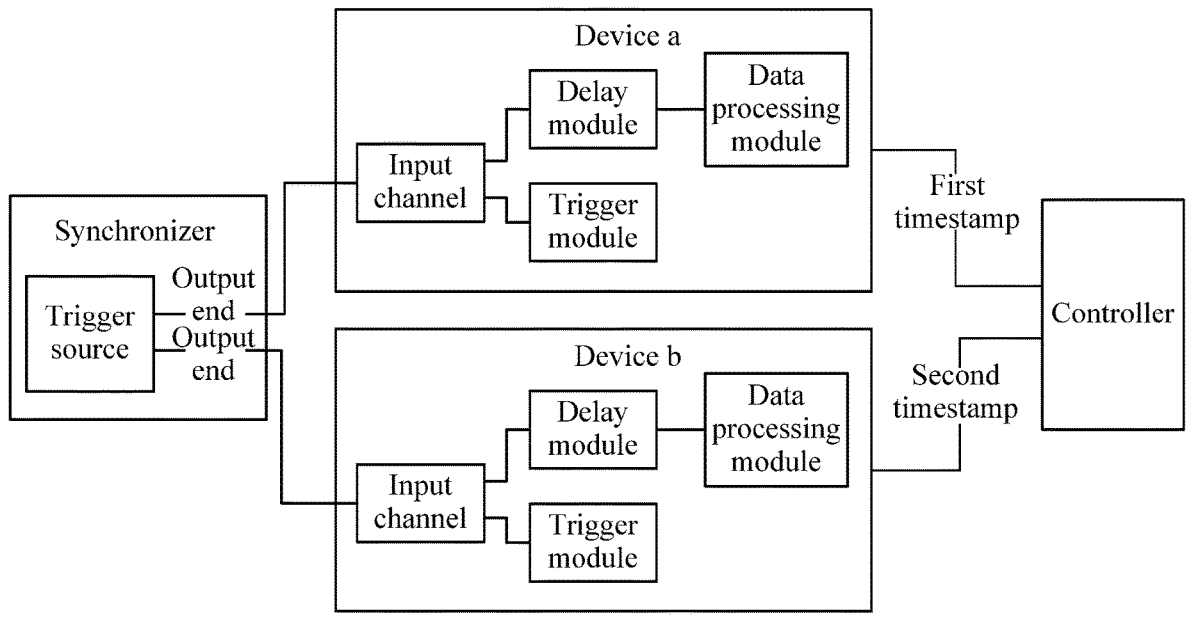
FIG. 5 is a diagram of a device synchronization calibration framework according to an embodiment of the present application.

Exemplarily, as shown in FIG. 5, the first trigger processing signal in this step may be a signal generated after a synchronization signal is output by a synchronizer to device a and device b and then is transmitted through an input channel of device a and an input channel of device b to trigger modules in corresponding devices respectively.

An acquisition manner of acquiring the first timestamp interval in response to the first trigger processing signal may be as follows: A first timestamp recorded by any device among the two current devices in response to the first trigger processing signal is acquired, a second timestamp recorded by another device among the two current devices in response to the first trigger processing signal is acquired, and the timestamp interval of the two current devices in response to the first trigger processing signal is acquired according to the first timestamp and the second timestamp.

For example, in device a, a signal transmitted via the input channel may be transmitted to a data processing module through a delay module. After a trigger module transmits the first trigger processing signal to the data processing module, the data processing module processes the signal transmitted by the delay module in response to the first trigger processing signal and records the current timestamp as the first timestamp. In device b, a trigger module transmits the first trigger processing signal to a data processing module, the data processing module performs the same processing process and records the current timestamp as the second timestamp. In this case, an interval between the first timestamp recorded by device a in response to the first trigger processing signal and the second timestamp recorded by device b in response to the first trigger processing signal is the first timestamp interval.

An acquisition manner of the synchronization signal may be aligning channels in a device. For example, a data channel is aligned with a trigger channel. The output of the synchronizer is calibrated by using the device in which the channels are aligned. Further, an output end of the calibrated synchronizer is connected to at least two devices. The synchronization signal is transmitted to the at least two devices from a trigger source in the synchronizer. As shown in FIG. 5, the output end of the synchronizer is connected to two devices and transmits the synchronization signal to the two devices.

In S402, a second timestamp interval of the two current devices in response to a second trigger processing signal is acquired.

Similarly, according to the implementation of the preceding step S401, as shown in FIG. 5, the second trigger processing signal in this step may be a signal generated by the trigger module in device a and the trigger module in device b based on another synchronization signal after the synchronization signal is output by the synchronizer to device a and device b.

An acquisition manner of acquiring the second timestamp interval in response to the second trigger processing signal may be as follows: A third timestamp recorded by any device among the two current devices in response to the second trigger processing signal is acquired, a fourth timestamp recorded by another device among the two current devices in response to the second trigger processing signal is acquired, and the timestamp interval of the two current devices in response to the second trigger processing signal is acquired according to the third timestamp and the fourth timestamp.

In device a, after the trigger module transmits the second trigger processing signal to the data processing module, the data processing module receives the signal transmitted via the input channel by the delay module, processes the signal transmitted by the delay module in response to the second trigger processing signal, and records the third timestamp. In device b, after the trigger module transmits the second trigger processing signal to the data processing module, the data processing module implements the same processing in response to the second trigger processing signal and records the fourth timestamp. In this case, an interval between the third timestamp recorded by device a and the fourth timestamp recorded by device b is the second timestamp interval.

In S403, a timestamp synchronization deviation is determined between the two current devices according to the first timestamp interval and the second timestamp interval.

The absolute value of the difference between the first timestamp interval and the second timestamp interval that are determined by the two current devices for two synchronization signals is taken as the timestamp synchronization deviation.

For example, it is assumed that the two current devices are device a and device b. A timestamp synchronization deviation Offset_ab between device a and device b may be determined through the formula below.

$$\text{Offset\_}ab=\||(a.TS1-b.TS1)|-|(a.TS2-b.TS2)|\| \quad (1)$$

a.TS1 denotes the timestamp recorded by device a in response to the first trigger processing signal. b.TS1 denotes the timestamp recorded by device b in response to the first trigger processing signal. a.TS2 denotes the timestamp recorded by device a in response to the second trigger processing signal. b.TS2 denotes the timestamp recorded by device b in response to the second trigger processing signal. $|(a.TS1-b.TS1)|$ denotes the first timestamp interval of device a and device b in response to the first trigger processing signal. $|(a.TS2-b.TS2)|$ denotes the second timestamp interval of device a and device b in response to the second trigger processing signal.

Figure 6:
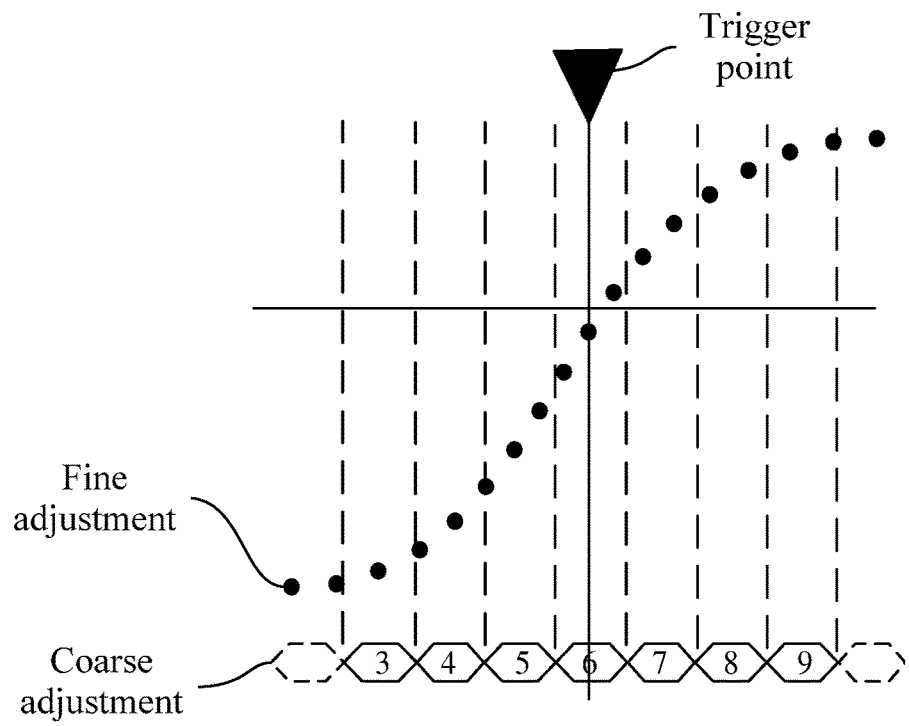
FIG. 6 is a diagram of a timestamp according to an embodiment of the present application.

A preceding timestamp mainly includes two parts of information. One part is a count value that is generated by a working clock of each device and accumulated from an initial value (for example, 0) with a clock period as a step. The other part is the more accurate clock position information determined and obtained through a fine trigger by using a signal. That is, a.TS1, b.TS1, a.TS2, and b.TS2 are each composed of two parts, that is, coarse adjustment and fine adjustment. Exemplarily, the two parts may be shown in FIG. 6.

In S404, two devices different from at least one of the two current devices are selected from the at least two devices, and the two selected devices are taken as two current devices.

Exemplarily, it is assumed that four devices exist, namely, device a, device b, device c, and device d. If the two current devices are device a and device b, two devices different from at least one of device a or device b may be selected from the four devices. For example, device a and device c are selected; alternatively, device c and device d are selected. The two selected devices are taken as two current devices.

In S405, the preceding steps S401 to S404 are performed repeatedly until the timestamp synchronization deviation between each two devices among the at least two devices is acquired.

After the two current devices in step S404 are selected, the preceding steps S401 to S404 may be performed repeatedly. For example, for the selected device a and device c, after a timestamp synchronization deviation between the two devices is determined, two devices different from device a and device c may be re-selected. Moreover, a timestamp synchronization deviation between the re-selected two devices continues to be determined until the timestamp synchronization deviation between each two devices among the at least two devices is acquired. In an embodiment, after the preceding step S303, the controller may also send the synchronization calibration instruction to two devices corresponding to any timestamp synchronization deviation and/or send the synchronization calibration instruction to the synchronizer. The synchronization calibration instruction may include a pre-stage calibration instruction and/or a post-stage calibration instruction.

The pre-stage calibration instruction is used for instructing a device corresponding to any timestamp synchronization deviation to adjust a channel delay of the device according to any timestamp synchronization deviation. Alternatively, the pre-stage calibration instruction is used for instructing the synchronizer to adjust, according to any timestamp synchronization deviation, a delay of a channel in the synchronizer and corresponding to any timestamp synchronization deviation. Moreover, the synchronizer is connected to at least two devices through at least two channels in the synchronizer separately. That is, in the case where the timestamp synchronization deviation is not the set value, the pre-stage calibration instruction may be used by the device corresponding to the timestamp synchronization deviation to adjust the channel delay of the device according to the timestamp synchronization deviation or may be used by the synchronizer to adjust, according to the timestamp synchronization deviation, the delay of the channel connected to the corresponding device.

The post-stage calibration instruction is used for instructing the controller to perform delay compensation for a signal display manner according to any timestamp synchronization deviation.

Figure 7:
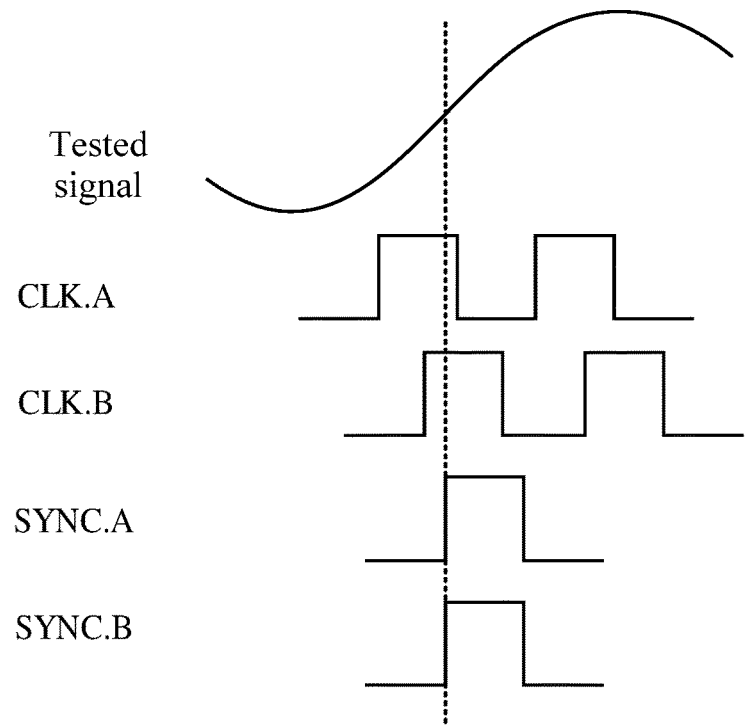
FIG. 7 is a diagram of a synchronization calibration result according to an embodiment of the present application.

A result after synchronization calibration is performed for two devices through the synchronization calibration instruction is shown in FIG. 7. A tested signal in FIG. 7 may be understood as a signal input by the synchronizer to the two connected devices. CLK.A and CLK.B denote signal waveforms for the two devices sampling the tested signal. SYNC.A and SYNC.B denote signal waveforms after the two devices are synchronized.

Figure 8:
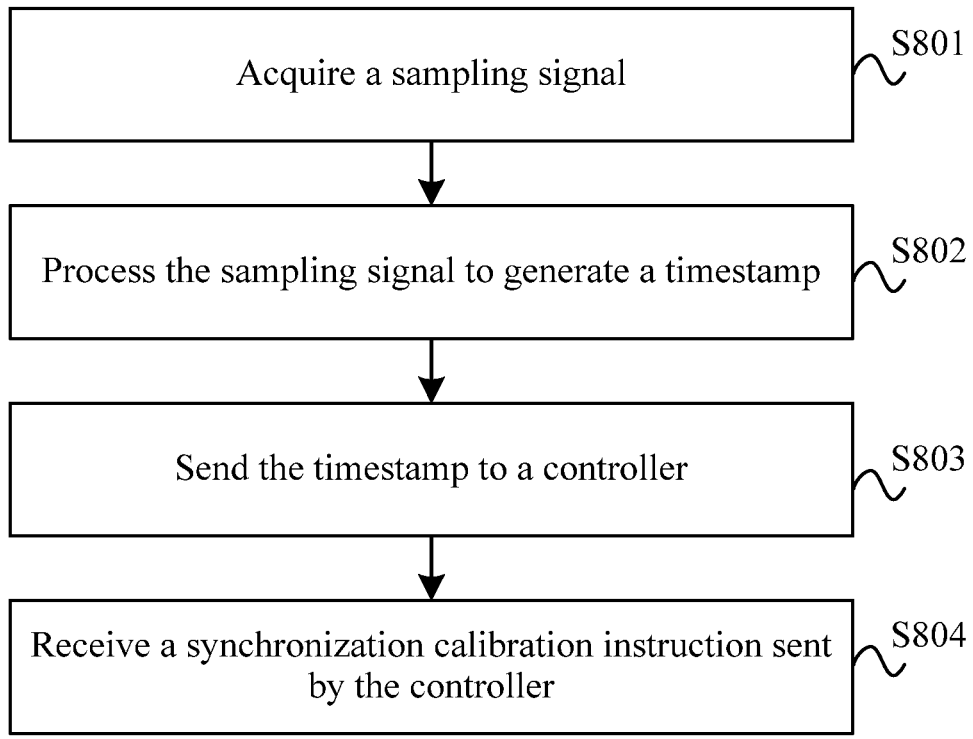
FIG. 8 is a flowchart of a device synchronization calibration method according to an embodiment of the present application.

FIG. 8 is a flowchart of a device synchronization calibration method according to an embodiment of the present application. The method can be applied in a device. As shown in FIG. 8, the method may include the steps below.

In S801, a sampling signal is acquired.

The sampling signal may be understood as a signal transmitted by a synchronizer and connected to the device.

In S802, the sampling signal is processed to generate a timestamp.

Exemplarily, in this embodiment of the present application, manners for the device processing the acquired sampling signal may include coarse adjustment and fine adjustment. For example, coarse adjustment is performed for the sampling signal; fine adjustment is performed, according to a trigger signal, for the sampling signal after coarse adjustment; and the timestamp is generated according to the sampling signal after fine adjustment.

The trigger signal in the preceding process is generated by the device based on the sampling signal.

In S803, the timestamp is sent to a controller.

The controller may be a controller in an independent device or a controller in the device. After the device generates the timestamp, the timestamp may be transmitted to the controller.

In S804, a synchronization calibration instruction sent by the controller is received. The synchronization calibration instruction is used for performing synchronization calibration for the device.

This embodiment of the present application provides a device synchronization calibration method. The method includes acquiring a sampling signal, processing the sampling signal to generate a timestamp, sending the timestamp to a controller, and receiving a synchronization calibration instruction sent by the controller. The synchronization calibration instruction is used for performing synchronization calibration for the device. In this case, it may be determined by the controller through the timestamp whether the corresponding device is synchronized. In the case where the device is not synchronized, the synchronization calibration instruction sent by the controller is received to calibrate the device, thereby effectively alleviating a delay in synchronization between multiple devices.

In an embodiment, the synchronization calibration instruction may carry a timestamp synchronization deviation. The timestamp synchronization deviation may be calculated and obtained by the controller according to the timestamp in the preceding step S803.

Figure 9:
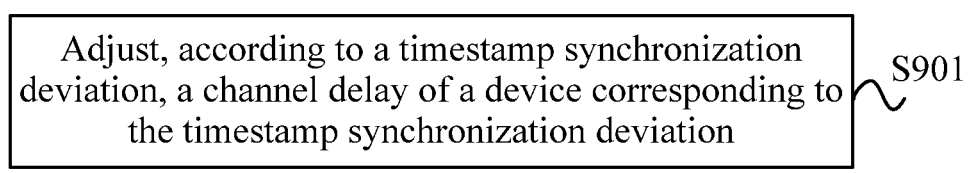
FIG. 9 is a flowchart of a device synchronization calibration method according to an embodiment of the present application.

As shown in FIG. 9, after the preceding step S804, the method may also include but is not limited to the step below.

In S901, a channel delay of the device corresponding to the timestamp synchronization deviation is adjusted according to the timestamp synchronization deviation.

Figure 10:
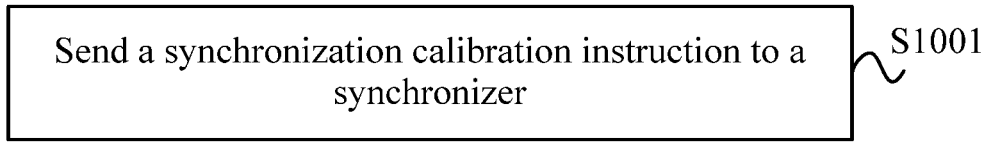
FIG. 10 is a flowchart of a device synchronization calibration method according to an embodiment of the present application.

In an embodiment, the synchronization calibration instruction carries the timestamp synchronization deviation. The timestamp synchronization deviation may be calculated and obtained by the controller according to the timestamp in the preceding step S803. As shown in FIG. 10, after the preceding step S804, the method may also include but is not limited to the step below.

In S1001, the synchronization calibration instruction is sent to the synchronizer.

The synchronization calibration instruction is used for instructing the synchronizer to adjust, according to the timestamp synchronization deviation, a delay of a channel in the synchronizer and corresponding to the timestamp synchronization deviation. The synchronizer may be connected to the device through any one of at least two channels in the synchronizer. In this case, the device may send the synchronization calibration instruction to the synchronizer through the channel. The synchronizer calibrates, according to the synchronization calibration instruction, the channel connected to the device.

Figure 11:
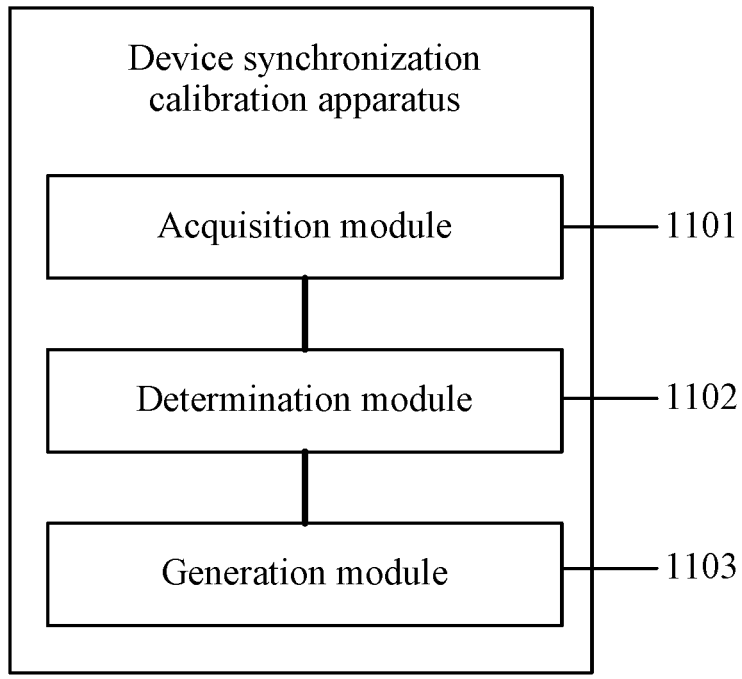
FIG. 11 is a structural diagram of a device synchronization calibration apparatus according to an embodiment of the present application.

FIG. 11 is a structural diagram of a device synchronization calibration apparatus according to an embodiment of the present application. As shown in FIG. 11, the apparatus may include an acquisition module 1101, a determination module 1102, and a generation module 1103.

The acquisition module is configured to acquire timestamp synchronization deviations between all two devices among at least two devices.

The determination module is configured to determine whether the timestamp synchronization deviation between each two devices among the at least two devices is a set value.

The generation module is configured to generate a synchronization calibration instruction based on the case where any timestamp synchronization deviation is not the set value.

The synchronization calibration instruction is used for performing synchronization calibration for two devices corresponding to any timestamp synchronization deviation.

Exemplarily, the preceding acquisition module may be configured to perform the steps below.

In step one, a first timestamp interval of two current devices in response to a first trigger processing signal is acquired.

In step two, a second timestamp interval of the two current devices in response to a second trigger processing signal is acquired.

In step three, a timestamp synchronization deviation is determined between the two current devices according to the first timestamp interval and the second timestamp interval.

In step four, two devices different from at least one of the two current devices are selected from the at least two devices, and the two selected devices are taken as two current devices.

The preceding steps one to four are performed repeatedly until the timestamp synchronization deviation between each two devices among the at least two devices is acquired.

For example, the acquisition module may be configured to acquire a first timestamp recorded by any device among the two current devices in response to the first trigger processing signal or the second trigger processing signal, to acquire a second timestamp recorded by another device among the two current devices in response to the first trigger processing signal or the second trigger processing signal, and to acquire the timestamp interval of the two current devices in response to the first trigger processing signal or the second trigger processing signal according to the first timestamp and the second timestamp.

For example, the preceding synchronization calibration instruction may include a pre-stage calibration instruction and/or a post-stage calibration instruction.

The pre-stage calibration instruction is used for instructing a device corresponding to any timestamp synchronization deviation to adjust a channel delay of the device according to any timestamp synchronization deviation. Alternatively, the pre-stage calibration instruction is used for instructing a synchronizer to adjust, according to any timestamp synchronization deviation, a delay of a channel in the synchronizer and corresponding to any timestamp synchronization deviation. Moreover, the synchronizer is connected to at least two devices through at least two channels in the synchronizer separately.

The post-stage calibration instruction is used for instructing the controller to perform delay compensation for a signal display manner according to any timestamp synchronization deviation.

In an example, the preceding apparatus may further include a transmission module.

The transmission module is configured to send the synchronization calibration instruction to two devices corresponding to any timestamp synchronization deviation and/or send the synchronization calibration instruction to the synchronizer.

The preceding device synchronization calibration apparatus may perform the device synchronization calibration method provided in FIGS. 3 and 4 and has corresponding components and beneficial effects in the method.

Figure 12:
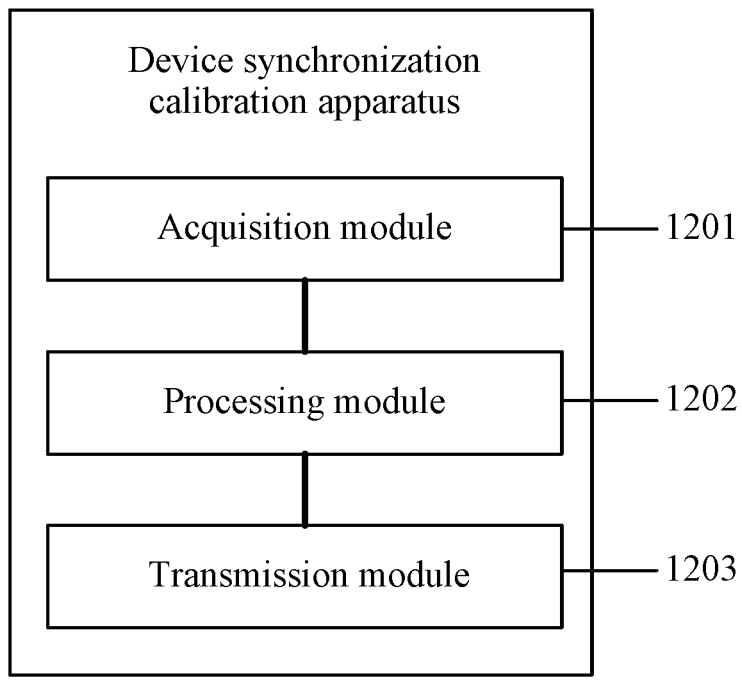
FIG. 12 is a structural diagram of a device synchronization calibration apparatus according to an embodiment of the present application.

FIG. 12 is a structural diagram of a device synchronization calibration apparatus according to an embodiment of the present application. As shown in FIG. 12, the apparatus may include an acquisition module 1201, a processing module 1202 and a transmission module 1203.

The acquisition module is configured to acquire a sampling signal.

The processing module is configured to process the sampling signal to generate a timestamp.

The transmission module is configured to send the timestamp to a controller and receive a synchronization calibration instruction sent by the controller. The synchronization calibration instruction is used for performing synchronization calibration for the device.

In an example, the preceding processing module is configured to perform coarse adjustment for the sampling signal, to perform, according to a trigger signal, fine adjustment for the sampling signal after coarse adjustment, and to generate the timestamp according to the sampling signal after fine adjustment.

The trigger signal is generated by the preceding apparatus based on the sampling signal.

In an example, the synchronization calibration instruction carries a timestamp synchronization deviation.

The processing module is configured to adjust a channel delay of the processing module according to the timestamp synchronization deviation.

In an embodiment, the synchronization calibration instruction carries the timestamp synchronization deviation. The transmission module is configured to send the synchronization calibration instruction to the synchronizer.

The synchronization calibration instruction is used for instructing the synchronizer to adjust, according to the timestamp synchronization deviation, a delay of a channel in the synchronizer and corresponding to the timestamp synchronization deviation. The synchronizer may be connected to the preceding device through any one of at least two channels in the synchronizer.

The preceding device synchronization calibration apparatus may perform the device synchronization calibration method provided in FIGS. 7 and 8 and has corresponding components and beneficial effects in the method.

Figure 13:
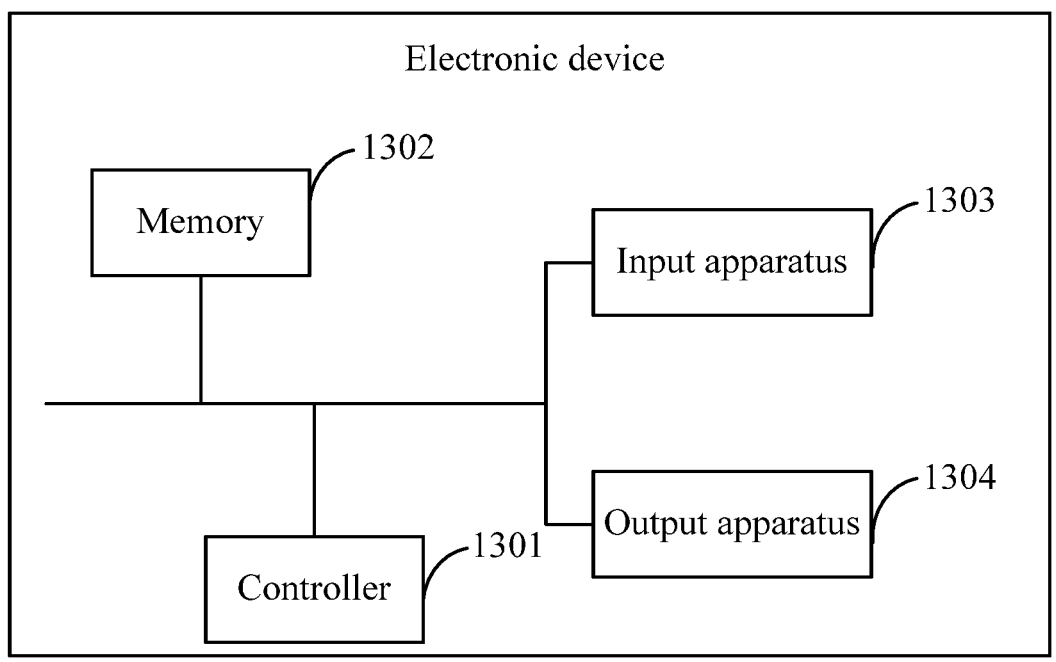
FIG. 13 is a structural diagram of an electronic device according to an embodiment of the present application.

FIG. 13 is a structural diagram of an electronic device according to embodiment 13 of the present application. As shown in FIG. 13, the device includes a processor 1301, a memory 1302, an input apparatus 1303, and an output apparatus 1304. One or more processors 1301 may be disposed in the device. One processor 1301 is used as an example in FIG. 13. The processor 1301, the memory 1302, the input apparatus 1303, and the output apparatus 1304 that are in the device may be connected through a bus or in other manners. In FIG. 13, the connection through a bus is used as an example.

The memory 1302, as a non-transitory computer-readable storage medium, can be configured to store non-transitory software programs, non-transitory computer-executable programs, and modules, for example, program instructions/modules (for example, modules in the device synchronization calibration apparatus in embodiments of FIGS. 11 and 12) corresponding to the device synchronization calibration method in embodiments of FIGS. 3, 4, 8, 9, and 10. The processor 1301 executes software programs, instructions, and modules stored in the memory 1302 to perform various functional applications and data processing of the apparatus, that is, to perform the preceding device synchronization calibration method.

The memory 1302 may mainly include a program storage region and a data storage region. The program storage region may store an operating system and at least one application required for functions. The data storage region may store data and the like created according to the use of the terminal. In addition, the memory 1302 may include a high speed random-access memory and may also include a non-volatile memory, for example, at least one disk memory element, flash memory element, or another non-volatile solid-state memory element. In some examples, the memory 1302 may include memories which are remotely disposed relative to the controller 1301 and these remote memories may be connected to the terminal/server via a network. Examples of the preceding network include, but are not limited to, the Internet, an intranet, a local area network, a mobile communication network, and a combination thereof.

The input apparatus 1303 may be configured to receive input digital or character information and generate key signal input related to user settings and function control of the apparatus. The output apparatus 1304 may include display apparatus such as a display screen.

Embodiments of the present application further provide a storage medium including a computer-executable instruction. When the computer-executable instruction is executed by a computer processor, a device synchronization calibration method is configured to be performed. The method includes the steps described in embodiments of FIGS. 3, 4, 8, 9, and 10.

From the preceding description of embodiments, it will be apparent to those skilled in the art that the present application may be implemented by means of software and necessary general-purpose hardware, or may be implemented by hardware. Based on this understanding, technical solutions of the present application substantially, or the part contributing to the related art, may be embodied in the form of a software product. The computer software product may be stored in a computer-readable storage medium, such as a computer floppy disk, a read-only memory (ROM), a random-access memory (RAM), a flash, a hard disk or an optical disk and includes several instructions for causing a computer device (which may be a personal computer, a server or a network device) to execute the methods described in embodiments of the present application. The storage medium may be a non-transient storage medium.

Exemplarily, a solution described in the present application may be applied between a synchronizer, a device, and a controller. The synchronizer includes a trigger source. It is assumed that four devices exist, namely, device a, device b, device c, and device d. Device a and device b are selected as two current devices. Synchronization calibration needs to be performed for the two devices. Device a and device b acquire a sampling signal separately and perform coarse adjustment for the sampling signal to obtain the sampling signal after coarse adjustment. Fine adjustment is performed, according to a trigger signal sent by the trigger source in the synchronizer, for the sampling signal after coarse adjustment. A timestamp is generated according to the sampling signal after fine adjustment. The trigger signal is generated by device a or device b based on the sampling signal.

For example, a tested signal may be understood as a signal input by the synchronizer to device a. Device a samples the tested signal to form the sampling signal CLK.A. In the working process of device a, device a may also generate the trigger signal based on the sampling signal CLK.A. A working clock of device a accumulates a count value from an initial value with a clock period as a step. That is, coarse adjustment is performed for the timestamp of device a, and a coarse-adjustment timestamp is recorded. Then device a performs fine adjustment for the sampling signal after coarse adjustment according to the trigger signal to acquire more accurate clock position information. That is, fine adjustment is performed for the timestamp of device a, a fine-adjustment timestamp after fine adjustment is recorded, and the timestamp of device a is finally determined according to a superimposition result of the coarse-adjustment timestamp and the fine-adjustment timestamp.

In determining a timestamp synchronization deviation between device a and device b, the trigger source in the synchronizer sends a first synchronization signal to device a and device b. After device a and device b samples the first synchronization signal to acquire the sampling signal, trigger modules in the two devices each generate a first trigger processing signal. Device a acquires the coarse-adjustment timestamp based on the sampling signal. The controller acquires the fine-adjustment timestamp based on the first trigger processing signal. Finally, a first timestamp of device a for the first synchronization signal (or the first trigger processing signal) is determined. Device b acquires the coarse-adjustment timestamp based on the sampling signal. The controller acquires the fine-adjustment timestamp based on the first trigger processing signal. Finally, a second timestamp of device b for the first synchronization signal (or the first trigger processing signal) is determined. The controller records an interval between the first timestamp of device a for the first synchronization signal (or the first trigger processing signal) and the second timestamp of device b for the first synchronization signal (or the first trigger processing signal) and determines the interval as a first timestamp interval. Similarly, the trigger source in the synchronizer sends a second synchronization signal to device a and device b. Device a and device b perform the same processing for the second synchronization signal so that the controller acquires a third timestamp of device a for the second synchronization signal (or a second trigger processing signal) and a four timestamp of device b for the second synchronization signal (or the second trigger processing signal). The controller records an interval between the third timestamp of device a for the second synchronization signal (or the second trigger processing signal) and the fourth timestamp of device b for the second synchronization signal (or the second trigger processing signal) and determines the interval as a second timestamp interval.

The controller determines a timestamp synchronization deviation between device a and device b according to the first timestamp interval and the second timestamp interval. It is determined whether the timestamp synchronization deviation between device a and device b is a set value. In the case where the timestamp synchronization deviation is not the set value, the controller generates a synchronization calibration instruction for performing synchronization calibration for device a and device b.

What is claimed is:

1. A device synchronization calibration method, applied to a controller, comprising:
acquiring timestamp synchronization deviations between all two devices among at least two devices; wherein a timestamp synchronization deviation of the timestamp synchronization deviations is a deviation between first timestamp intervals recorded by two devices respectively in response to a first trigger processing signal and second timestamp intervals recorded by the two devices respectively in response to a second trigger processing signal;
determining whether each of the timestamp synchronization deviations between the all two devices is a set value; and
generating a synchronization calibration instruction in response to a determination result that a timestamp synchronization deviation among the timestamp synchronization deviations is not the set value,
wherein the synchronization calibration instruction is used for performing synchronization calibration for two devices with the timestamp synchronization deviation being not the set value.

2. The method according to claim 1, wherein acquiring the timestamp synchronization deviations between all two devices among the at least two devices comprises:
acquiring a first timestamp interval of two current devices among the at least two devices in response to a first trigger processing signal;

acquiring a second timestamp interval of the two current devices in response to a second trigger processing signal;

determining a timestamp synchronization deviation between the two current devices according to the first timestamp interval and the second timestamp interval;

selecting, from the at least two devices, two devices different from at least one of the two current devices and taking the two selected devices as two current devices; and re-performing: the acquiring the first timestamp interval of the two current devices in response to the first trigger processing signal; the acquiring the second timestamp interval of the two current devices in response to the second trigger processing signal; the determining the timestamp synchronization deviation between the two current devices according to the first timestamp interval and the second timestamp interval; and the selecting, from the at least two devices, the two devices different from the at least one of the two current devices and taking the two selected devices as the two current devices, until the timestamp synchronization deviations between the all two devices among the at least two devices are acquired.

3. The method according to claim 2, wherein acquiring the first timestamp interval of the two current devices in response to the first trigger processing signal comprises:
acquiring a first timestamp recorded by one of the two current devices in response to the first trigger processing signal;
acquiring a second timestamp recorded by another one of the two current devices in response to the first trigger processing signal; and
acquiring, according to the first timestamp and the second timestamp, the first timestamp interval of the two current devices in response to the first trigger processing signal; and
acquiring the second timestamp interval of the two current devices in response to the second trigger processing signal comprises:
acquiring a third timestamp recorded by one of the two current devices in response to the second trigger processing signal;
acquiring a fourth timestamp recorded by another one of the two current devices in response to the second trigger processing signal; and
acquiring, according to the third timestamp and the fourth timestamp, the second timestamp interval of the two current devices in response to the second trigger processing signal.

4. The method according to claim 1, wherein the synchronization calibration instruction comprises at least one of a pre-stage calibration instruction or a post-stage calibration instruction, wherein
the pre-stage calibration instruction is used for instructing a device corresponding to the timestamp synchronization deviation being not the set value to adjust a channel delay of the device according to the timestamp synchronization deviation being not the set value; or
the pre-stage calibration instruction is used for instructing a synchronizer to adjust, according to the timestamp synchronization deviation being not the set value, a delay of a channel in the synchronizer and corresponding to the timestamp synchronization deviation being not the set value; and the synchronizer is connected to the at least two devices through at least two channels in the synchronizer separately; and the post-stage calibration instruction is used for instructing the controller to perform delay compensation for a signal display manner according to the timestamp synchronization deviation being not the set value.

5. The method according to claim 1, wherein in a case where the synchronization calibration instruction comprises the pre-stage calibration instruction, after the synchronization calibration instruction is generated, the method further comprises at least one of:
sending the synchronization calibration instruction to the two devices with the timestamp synchronization deviation being not the set value and
sending the synchronization calibration instruction to the synchronizer.

6. An electronic device, comprising a memory, a processor, and a computer program stored in the memory and executable on the processor, wherein when executing the computer program, the processor performs the device synchronization calibration method according to claim 1.

7. A non-transitory computer storage medium for storing a computer program, wherein when the computer program is executed by a processor, the device synchronization calibration method according to claim 1.

8. The method according to claim 4, wherein in a case where the synchronization calibration instruction comprises the pre-stage calibration instruction, after the synchronization calibration instruction is generated, the method further comprises at least one of:
sending the synchronization calibration instruction to the two devices with the timestamp synchronization deviation being not the set value and
sending the synchronization calibration instruction to the synchronizer.

9. A device synchronization calibration method, applied to a device, comprising:
acquiring a sampling signal;
processing the sampling signal to generate a timestamp;
sending the timestamp to a controller; and
receiving a synchronization calibration instruction sent by the controller, wherein the synchronization calibration instruction comprises a timestamp synchronization deviation, the timestamp synchronization deviation is used for adjusting a channel delay for the device, and the timestamp synchronization deviation is a deviation between first timestamp intervals recorded by two devices respectively in response to a first trigger processing signal and second timestamp intervals recorded by the two devices respectively in response to a second trigger processing signal.

10. The method according to claim 9, wherein processing the sampling signal to generate the timestamp comprises:
performing coarse adjustment for the sampling signal;
performing, according to a trigger signal, fine adjustment for the sampling signal after the coarse adjustment; and
generating the timestamp according to the sampling signal after the fine adjustment,
wherein the trigger signal is generated by the device according to the sampling signal.

11. The method according to claim 9, wherein the method further comprises:
sending the synchronization calibration instruction to a synchronizer, wherein the synchronization calibration instruction is used for instructing the synchronizer to adjust, according to the timestamp synchronization deviation, a delay of a channel in the synchronizer and corresponding to the timestamp synchronization deviation; and the synchronizer is connected to the device through any one of at least two channels in the synchronizer.

12. An electronic device, comprising a memory, a processor, and a computer program stored in the memory and executable on the processor, wherein when executing the computer program, the processor performs the device synchronization calibration method according to claim 9.

13. A non-transitory computer storage medium for storing a computer program, wherein when the computer program is executed by a processor, the device synchronization calibration method according to claim 9.

14. The method according to claim 10, wherein the method further comprises:
  sending the synchronization calibration instruction to a synchronizer, wherein the synchronization calibration instruction is used for instructing the synchronizer to adjust, according to the timestamp synchronization deviation, a delay of a channel in the synchronizer and corresponding to the timestamp synchronization deviation; and the synchronizer is connected to the device through any one of at least two channels in the synchronizer.

* * * * *